United States Patent [19]
Nagashima et al.

[11] Patent Number: 6,032,370
[45] Date of Patent: Mar. 7, 2000

[54] PORTABLE TRIMMER

[75] Inventors: Akira Nagashima, Kawasaki; Osamu Tada, Tokyo, both of Japan

[73] Assignee: Kioritz Corporation, Tokyo, Japan

[21] Appl. No.: 09/033,908

[22] Filed: Mar. 3, 1998

[30] Foreign Application Priority Data

Mar. 4, 1997 [JP] Japan .......................... 9-49352

[51] Int. Cl.⁷ .................................. A01D 69/10
[52] U.S. Cl. ..................... 30/276; 30/277.4; 188/166; 56/12.7; 56/11.3
[58] Field of Search .................. 30/276, 277.4; 188/72.7, 166; 56/12.7, 11.3, 10.5

[56] References Cited

U.S. PATENT DOCUMENTS

| | | | |
|---|---|---|---|
| 4,006,528 | 2/1977 | Katsuya | 30/276 |
| 4,760,685 | 8/1988 | Smith | 56/11.3 |
| 4,916,813 | 4/1990 | Elia | 30/276 |
| 4,976,093 | 12/1990 | Everts | 56/11.3 |
| 5,636,444 | 6/1997 | Nickel | 30/276 |
| 5,768,786 | 6/1998 | Kane et al. | 30/276 |

FOREIGN PATENT DOCUMENTS 54-1378  1/1979  Japan .
55-49607  11/1980  Japan .

*Primary Examiner*—Rinaldi I. Rada
*Assistant Examiner*—T. Anthony Vaughn
*Attorney, Agent, or Firm*—Jacobson, Price, Holman & Stern, PLLC

[57] ABSTRACT

A portable trimmer for cutting weeds comprises a cutter, a driving device for rotationally driving the cutter, a control lever for controlling power of the driving device, a braking device for stopping rotation of the cutter, and an interlocking device operatively connected with the control lever and the braking device. The braking device has a wedge shaped brake shoe that is connected with the interlocking device and has an inclined upper surface inclined downwardly from a rotationally retarded side toward a rotationally advanced side of the cutter, a housing enclosing the brake shoe and having an inclined guide surface opposite to the inclined upper surface of the brake shoe, and a pressing device provided between the brake shoe and the housing and for causing an initial movement of the brake shoe toward a cutter surface of the cutter. The inclined guide surface guides the brake shoe from a braking position to a released position where the brake shoe is spaced from the cutter surface by being moved toward the rotationally retarded side of the cutter by being pulled by the interlocking device against a pressing force applied by the pressing device.

2 Claims, 4 Drawing Sheets

PORTABLE TRIMMER

BACKGROUND OF THE INVENTION

The present invention relates to a portable trimmer for cutting weeds and more particularly, it relates to a portable trimmer having an improved braking device for stopping free rotation of a cutter mounted thereon.

DESCRIPTION OF THE PRIOR ART

A portable trimmer for cutting weeds which is driven by driving means has been known. A typical conventional portable trimmer comprises driving means such as a compact air-cooled type two stroke internal combustion engine, a supporting tube extending straight from the engine in a forward direction, an output shaft extending from the engine and inserted in the supporting tube, and a rotatable cutter provided at a forward end of the supporting tube and being driven by the driving means via the output shaft and bevel gears, and a control lever which is provide at the middle of the supporting tube and is for controlling power of the driving means. In such a portable trimmer, the cutter is rotatably driven by the driving means by manipulating the control lever. However, even after the control lever is released to cause a centrifugal clutch to be disengaged, the cutter still keeps rotating due to inertia. In order to prevent any accidents which may be caused by the rotation thereof, it is known to mount a braking device on the trimmer to stop the free rotation of the cutter. Such a braking system is generally activated by an interlocking member such as a wire which is connected with the control lever.

For example, a braking device disclosed in Japanese Utility Model Public Disclosure No. sho 55-49607 is provided in the vicinity of a cutter. A brake shoe thereof can swing between a braking position where the brake shoe is pressed against a cutter surface of the cutter and a released position where the brake shoe is moved away from the cutter. The brake shoe is moved between the released position and the braking position by a rod member which is interlocked with a brake lever provided in the middle of an supporting tube thereof to stop the free rotation of the cutter. It also discloses that the brake lever can be combined with a throttle lever of the trimmer. The braking device disclosed therein requires a spring which can provide a strong braking force to strongly press the brake shoe against the cutter surface. It means that, it requires to apply a strong force to manipulate the brake lever which results in poor operability thereof.

Further, in a braking device disclosed in Japanese Utility Model Public Disclosure sho 54-1378, female threads formed in a braking flange are threadably engaged with male threads formed in a lower portion of a gear case which houses bevel gears for driving a cutter. The female and male threads are oriented so as to be disengaged from each other when rotated in the same direction as a rotational direction of the cutter. At a braking position, the braking flange is pressed against a cutter surface by a torsion spring acting in the same direction as the rotational direction of the cutter. A wire which is connected with a brake lever at one end thereof is wound around the braking flange. By pulling the brake lever to operate an apparatus having the braking device, the wire is pulled thereby. It causes the braking flange to be rotated against a spring force exerted by the torsion spring in a direction opposite from the rotational direction of the cutter, whereby the braking flange is moved toward the inside of the gear case. By the movement of the braking flange, a brake shoe mounted thereon is moved away from the cutter surface to allow the cutter to rotate during the operation of the apparatus. When the brake lever is released causing the wire to be relaxed, the braking flange is rotated by the torsion spring in the same direction as the cutter to move toward the cutter and is pressed against the cutter surface. The rotation of the cutter is stopped thereby.

SUMMARY OF THE INVENTION

A portable trimmer for cutting weeds in accordance with a first aspect of the invention comprises a cutter, driving means for rotationally driving the cutter, a control lever for controlling power of the driving means, a braking device for stopping rotation of the cutter, and an interlocking means operatively connected with the control lever and the braking device. The braking device has a wedge shaped brake shoe which is connected with the interlocking means and has an inclined upper surface inclined downwardly from a rotationally (trailing) retarded side toward a rotationally advanced (leading) side of the cutter, a housing which encloses the brake shoe and has an inclined guide surface being opposed to the inclined upper surface of the brake shoe, and a pressing means provided between the brake shoe and the housing and for causing an initial movement of the brake shoe toward a cutter surface of the cutter. The inclined guide surface guides the brake shoe from a braking position to a released position where the brake shoe is spaced from the cutter surface toward the rotationally retarded side of the cutter by being pulled by the interlocking means against a pressing force applied by the pressing means.

The braking device mounted on the portable trimmer in accordance with the first aspect of the present invention functions as follows. First, when the control lever is not manipulated by an operator, i.e., when a tension force is not applied on said Interlocking means, the rake shoe of the braking device is located at the braking position where the brake shoe is pressed against the cutter surface by the pressing means. When the operator pulls the lever to control the power of the driving means, the interlocking means is pulled thereby. It causes the brake shoe to move from the braking position to the released position where the brake shoe is spaced from the cutter surface toward the rotationally retarded side of the cutter. The brake shoe is guided by the inclined guide surface to move to the released position. The brake shoe is held in the released position while the cutter is rotatably driven by the driving means. Subsequently, when the operator releases the control lever to decelerate a rotational speed of the driving means, a centrifugal clutch is disengaged. Further, when the operator releases the control lever, the brake shoe is moved from the released position to the braking position by a force applied by the pressing means. When the brake shoe makes contact with the cutter surface, it is further moved toward the rotationally advanced side by friction between the brake shoe and the cutter surface. That is, the wedge shaped brake shoe is pulled into an area between the inclined guide surface and the cutter surface and being securely held therebetween, whereby the brake shoe is pressed by the inclined guide surface against the cutter surface. The rotation of the cutter is stopped thereby.

In the braking device mounted on the portable trimmer in accordance with the first aspect of the invention, it assures to create friction between the brake shoe and the cutter surface even when the brake shoe wears out and assures to constantly apply a sufficient braking force on the cutter by the brake shoe being pressed-against the cutter surface by the pressing means. Further, the pressing force exerted by the pressing means is selected to be the minimum needed to cause the initial movement of the brake shoe. It enables the operator to release the braking device with ease by applying a light tension force to the interlocking means.

A portable trimmer for cutting weeds in accordance with a second aspect of the invention comprises a cutter, driving means for rotationally driving the cutter, a control lever for controlling power of the driving means, a braking device for stopping rotation of the cutter, and an interlocking means operatively connected with the control lever and the braking device. The braking device has a brake shoe, a housing for covering the brake shoe, a parallel link mechanism connected to the brake shoe and the housing and having a pair of link members which are spaced from each other in a rotational direction of the cutter, and pressing means for causing an initial movement of the brake shoe to be pressed against a cutter surface of the cutter at a braking position. Each of the link members is connected with the housing at a pivot point and having a length which inclines from the pivot point toward a rotationally retarded direction (trailing) of the cutter. The brake shoe is moved from the braking position to a released position where the brake shoe is spaced from the cutter surface by being moved toward the rotationally retarded side of the cutter by the interlocking means against a pressing force applied by the pressing means. It causes the link members to swing about the connecting points.

The braking device of the portable trimmer in accordance with the second aspect of the invention functions as follows. First, when the control lever is not manipulated by the operator, i.e., a tension force is not applied to the interlocking member. The brake shoe of the braking device is located at the braking position where it is pressed against the cutter surface by the pressing means. Then, when the operator manipulates the control lever to control the power of the driving means, the interlocking means is pulled thereby. It causes the link members to swing about the connecting points with respect to the housing to move the brake shoe from the braking position to the released position where the brake shoe is spaced from the cutter surface toward the rotationally retarded side of the cutter. The brake shoe is held at the released position while the cutter is rotatably driven by the driving means. Subsequently, when the operator releases the control lever to decelerate the rotational speed of the driving means, the centrifugal clutch is disengaged thereby. Further, by releasing the control lever, the brake shoe is moved by the pressing force exerted by the pressing means from the released position to the pressed position caused by the initial movement applied thereby. When the brake shoe makes contact with the cutter surface, it is further moved toward the rotationally advanced (leading) side by friction between the brake shoe and the cutter surface to cause the brake shoe to be pressed against the cutter surface via the link members. The rotation of the cutter is stopped thereby.

In accordance with the braking device of the portable trimmer in accordance with the present invention, since the brake shoe is pressed against the cutter surface by the pressing means, even when the brake shoe wears out, it assures to create friction therebetween to provide a sufficient braking force. Further, the pressing force by the pressing means is selected to be the minimum needed to cause the initial movement of the brake shoe, the operator can easily release the braking device with ease by applying a light tension force to the interlocking means.

The above and other objects and feature of the present invention will become apparent from the following description made with reference to the accompanying drawings.

DESCRIPTION OF THE PREFERRED EMBODIMENTS

A preferred embodiment of the present invention shall be explained with reference to the drawings attached herewith.

Figure 1:
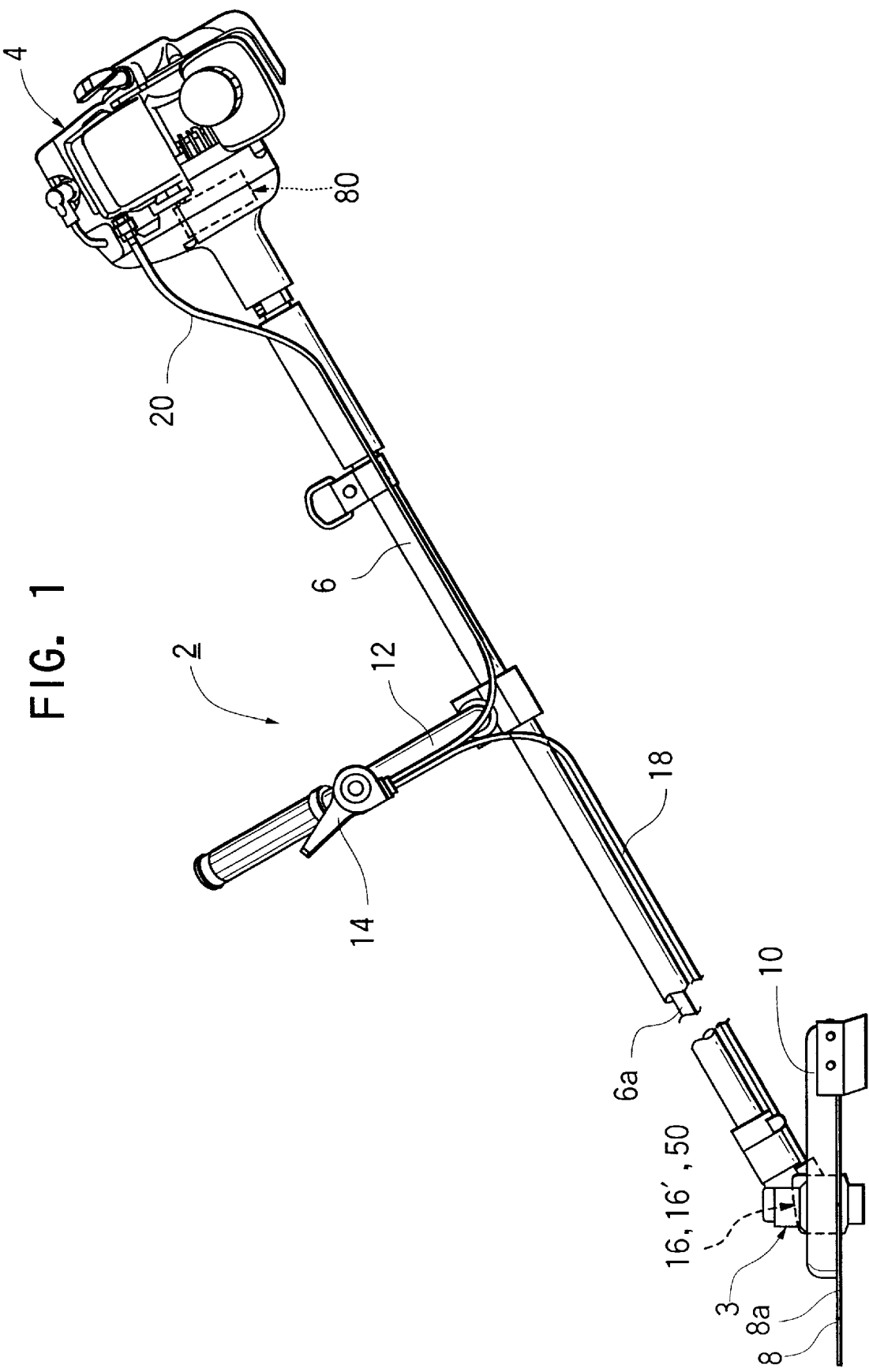
FIG. 1 shows a side view showing a portable trimmer in accordance with the embodiments.

As shown in FIG. 1, a portable trimmer 2 comprises a compact air-cooled type two-stroke internal combustion engine or driving means 4, a supporting tube 6 extending straight from the engine 4 in a forward direction, an output shaft 6a extending from the engine 4 in the forward direction inserted in the supporting tube 6, and a circular rotatable cutter 8 provided at a forward end of the supporting tube 6 and being rotatably driven by the engine 4 via the output shaft 6a and bevel gears housed in a gear case 3, a safety cover 10 which covers a back portion of the cutter 8 to prevent objects scattered by the cutter 8 from hitting an operator, a U-shaped handle 12 provided at the middle of the supporting tube 6, and a control lever 14 for controlling power of the engine 4 via a throttle Bowden cable 20 in which a wire member 72 is inserted. A braking device 16,16', 50 for stopping free rotation of the cutter 8 is mounted on the safety cover 10. The braking device 16, 16', 50 is operatively connected with the control lever 14 via the brake wire member 19 provided within the brake Bowden cable or interlocking means 18 extending along the supporting tube 6. The braking device 16, 16', 50 is interlocked with the power control of the engine 4.

Figure 2:
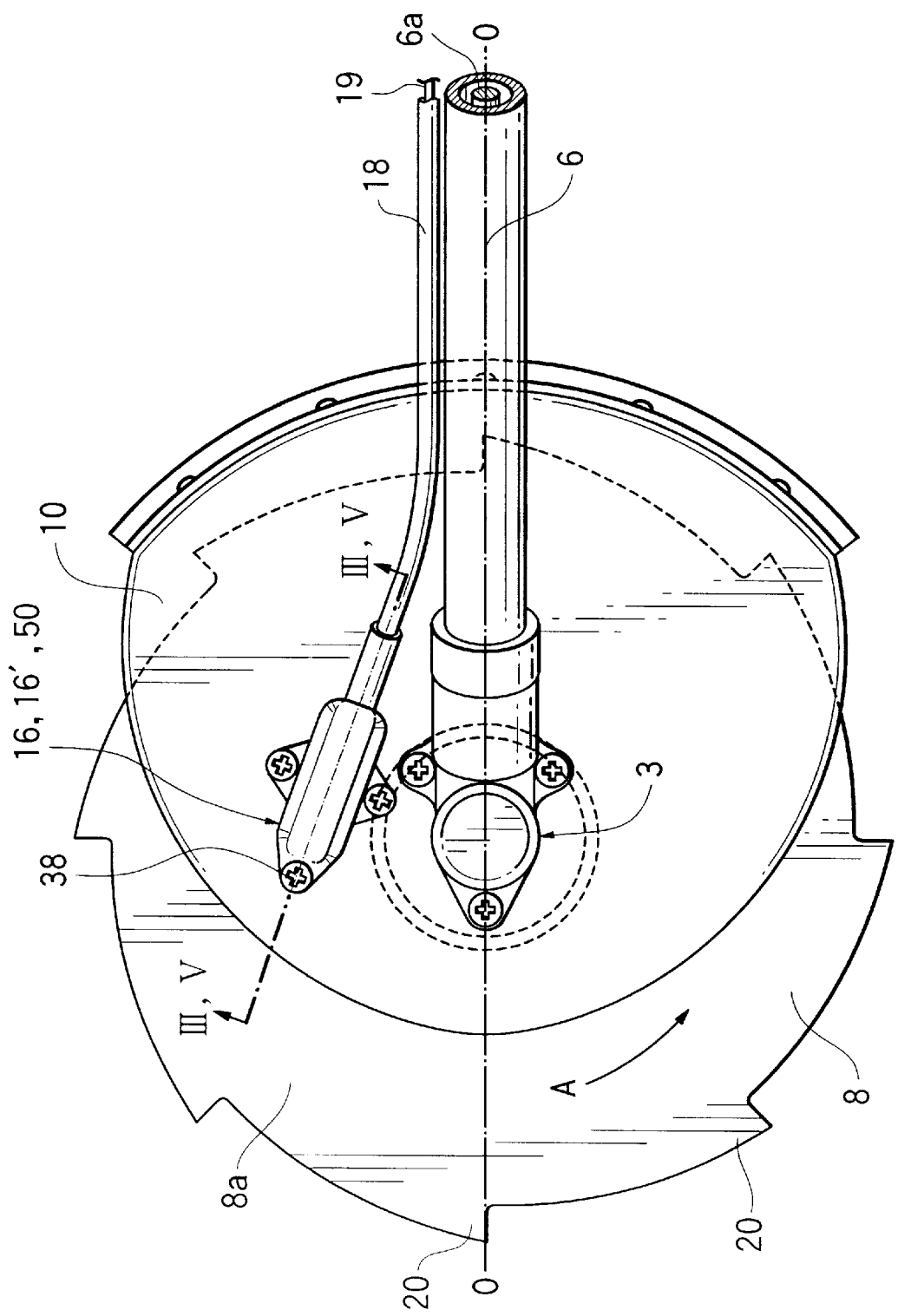
FIG. 2 shows a plane view of a cutter unit of the portable trimmer shown in FIG. 1.

FIG. 2 shows a plane view of a cutter unit of the portable trimmer shown in FIG. 1. The cutter 8 is rotatably driven by the engine 4 in a direction shown by an arrow A or a counter clockwise direction as viewed in the plane view depicted in FIG. 2. The weeds are trimmed by a left and front portions of a cutting edge of the cutter 8 with respect to an elongated axis 0-0 of the supporting tube 6 as viewed by the operator, i.e., a lower portion thereof with respect to the elongated axis 0-0 as viewed in FIG. 2. As can be understood from FIG. 2, a first braking device 16 is mounted on the safety cover 10 at a location opposite from the cutting edge to be used for a trimming operation, i.e., a location on a right side thereof with respect to the elongated axis 0-0 as viewed by the operator, or an upper side with respect to the elongated axis 0-0 as viewed in FIG. 2. This prevents entanglement of cut weeds into the Braking device.

Figure 3:
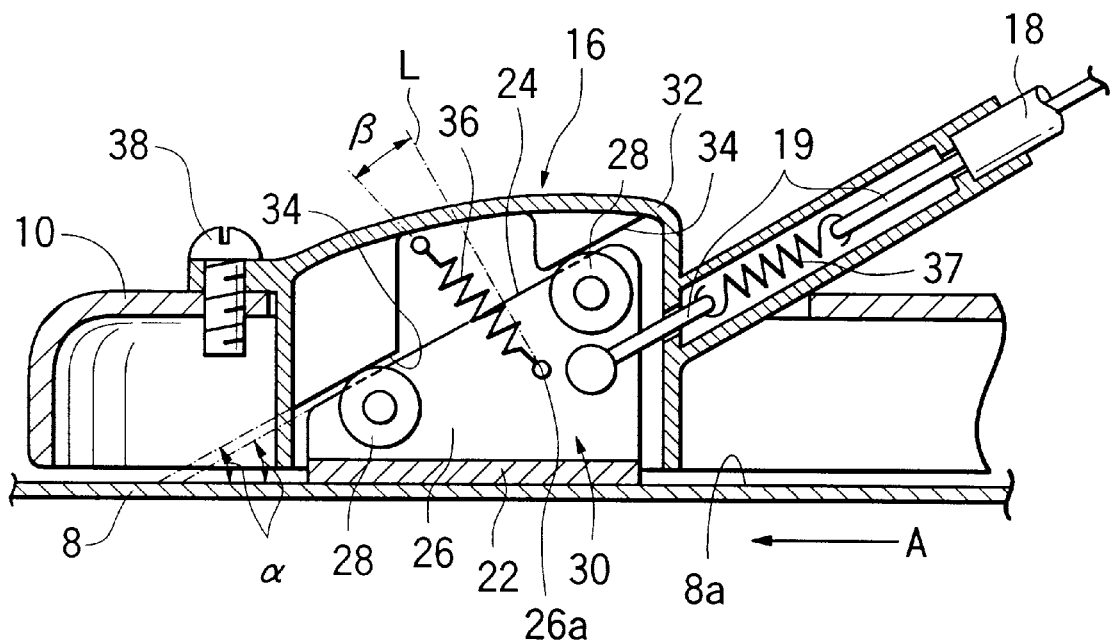
FIG. 3 shows a first embodiment of a braking device in accordance with the present invention for stopping rotation of the cutter and is a cross-sectional view along a line III—III shown in FIG. 2 where a brake shoe is at a braking position.

FIG. 3 shows a first embodiment of the braking device 16 in accordance with the present invention for stopping rotation of the cutter 8. It shows a cross-sectional view along a line III—III shown in FIG. 2 where a brake shoe 30 is at a braking position. As depicted in FIG. 3, the braking device 16 in accordance with the present embodiment comprises a brake lining 22 provided opposite to a cutter surface 8a of the cutter 8, a vertical plate 26 having an upper surface downwardly inclined from a rotationally retarded (trailing) side toward an rotationally advanced (leading) side with respect to the rotational direction of the cutter 8, rollers 28 mounted on the vertical plate 26. The brake shoe 30 is substantially wedge shaped as viewed in a side view shown in FIG. 3. The braking device 16 has a housing 32 which covers the brake shoe 30 and is fixed to the safety cover 10 by machine screws 38. The roller 28 facilitates return motion of the brake shoe 30 from the braking position shown in FIG. 3 which is located on the rotationally advanced side with respect to the rotation of the cutter 8 where the brake shoe 30 is pressed against the cutter surface 8a to a released position which is located on the retarded side with respect thereto where the brake shoe 30 is spaced from the cutter surface 8a. At the released position, the vertical plate 26 of the brake shoe 30 is in abutment with an inner wall surface 33 or stopper means of the housing 32 positioned on the rotationally retarded side thereof as shown in FIG. 3.

The housing 32 has an inclined guide surface 34 which engages with the rollers 28 and guides the brake shoe 30 between the braking position and the released position. The inclined upper surface 24 of the brake shoe 30 is opposing to the inclined guide surface 34 and they extends in parallel to each other. Each of those surfaces 24, 34 forms a first inclination angle $\alpha$ with respect to the cutter surface 8a. The braking device 16 has a tension coil spring 36 or pressing means provided between an upper wall of the housing 32 and the brake shoe 30. The tension coil spring 36 oriented at a second inclination angle $\beta$ inclined toward the rotationally advanced side of the cutter 8 about a connecting point 26a with the brake shoe 30 with respect to a line L vertical to the inclined upper surface 24 and the inclined guide surface 34. The tension coil spring 36 presses the rollers 28 of the brake shoe 30 against the inclined guide surface 34 of the housing 32 and causes an initial movement of the brake shoe 30. A pressing force thereof shall be determined so as to exceed a frictional force between the brake wire member 19 and the brake Bowden cable 18 and to be the minimum needed to press the brake shoe 30 against the cutter surface 8a in order to make the second inclination angle $\beta$ small.

As shown in FIG. 2, the first braking device 16 is provided so that an elongated axis thereof (the line III—III shown in FIG. 2) is oriented vertically with respect to a radial direction of the cutter 8 to enable the brake shoe 30 to move straight from the rotationally retarded side toward the rotationally advanced side caused by the rotation of the cutter 8.

The brake wire member 19 extends between the control lever 14 and the brake shoe 30 and connected thereto. The brake wire member 19 has a tension coil spring 37 disposed in the middle thereof and connected in series thereto. The brake shoe 30 is made to travel from the braking position to the released position by a tension force exerted by manipulation of the control lever 14.

The braking device 16 in accordance with the present embodiment functions as follows. When the operator pulls the control lever 14 upwardly to start the power control of the engine 4, the brake shoe 30 is pulled by the brake wire member 19 which is interlocked with the control lever 14 and moves from the braking position shown in FIG. 3 to the released position along the inclined guide surface 34 of the housing 32. When the control lever 14 is pulled further to control the power of the engine 4 after the brake shoe 30 reaches the released position where it is in abutment with the inner wall surface 33 of the housing 32, the tension spring 37 stretches. The tension spring 37 can absorb the tension force exerted by the control lever 14 by stretching to allow a further movement of the wire member 19 within a range of distance which the throttle wire member 72 needs to move to control the power of the engine 4 by the control lever 14.

When the operator releases the control lever 14 to cause the engine 4 to decelerate, a centrifugal clutch 80 for the engine 4 is disengaged. However, the cutter 8 still can rotate thereafter. Further, by releasing the control lever 14, the brake shoe 30 is moved toward the cutter surface 8a by the tensional force exerted by the tension spring 36. When the brake lining 22 is pressed against the cutter surface 8a, the brake shoe 30 which is substantially wedge shaped moves toward the rotationally advanced side caused by the rotation of the cutter 8 and is pulled into a triangular area formed between the inclined guide surface 34 of the housing 32 and the cutter surface 8a and securely held therein. This causes the inclined guide surface 34 to press the inclined upper surface 24 of the brake shoe 30 toward the cutter surface 8a and the rotation of the cutter 8 is immediately stopped by the pressing force applied thereby. The pressing force applied by the inclined guide surface 24 on the brake shoe 30 against the cutter surface 8a for braking is determined by the first inclined angle a of the inclined guide surface 34 of the housing 32 and the inclined upper surface 24 of the brake shoe 30. That is, the smaller the first inclined angle $\alpha$ is, the larger the pressing force becomes, or vice versa. Therefore, to stop the free rotation of the cutter 8 in a shorter period of time, the first inclined angle$\alpha$ is selected to be a small angle. To avoid exerting a large pressing force on the cutter 8 in order to avoid damaging the cutter 8, it is better to form the first inclined angle $\alpha$ with a large angle. Taking those two view points into consideration, it is preferable to determine the first inclined angle $\alpha$ so that the cutter 8 can be stopped in a period from approximately a half second to one second when the cutter 8 rotates at a rotational speed of, for example, between 4000 and 5000 RPM.

When the control lever 14 is pulled, the brake shoe 30 is moved from the braking position shown in FIG. 3 to the released position by the tension force exerted by the brake wire member 19. It functions as stated above.

Figure 4:
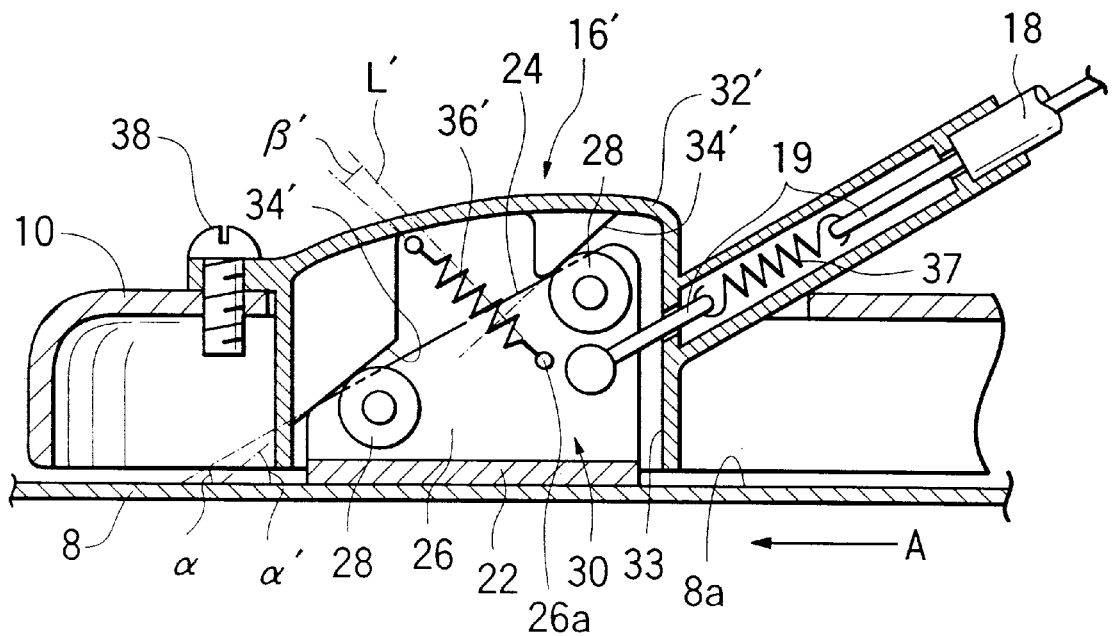
FIG. 4 shows a second embodiment in accordance with the present invention which is a modification of the first embodiment.

FIG. 4 shows a second embodiment in accordance with the present invention which is a modification of the first embodiment. Those elements which are no different from those shown in FIG. 3 are indicated by the same numerals and description therefor shall be omitted. As shown in FIG. 4, a housing 32' of a second braking device 16' according to the present invention has an inclined guide surface 34' which engages with the rollers 28 and for guiding the brake shoe 30 between the braking position and the released position. The inclined surface 24 of the brake shoe 30 in accordance with the second embodiment forms the first inclined angle $\alpha$ with respect to the cutter surface 8a as in the first embodiment. The inclined guide surface 34' of the housing 32' forms a second inclined angle $\alpha$' with respect to the cutter surface 8a which is larger than the first inclined angle $\alpha$ of the brake shoe 30. Further, the second braking device 16' has the brake shoe 30 and a tension spring 36' or pressing means provided between an inner surface of an upper wall of the housing 32' and the brake shoe 30. The tension spring 36' oriented at a third angle $\beta$' inclined toward the rotationally advanced side of the cutter 8 about the connecting point 26a with the brake shoe 30 with respect to a line L' vertical to the inclined guide surface 34'. The tension spring 36' presses the rollers 28 of the brake shoe 30 against the inclined guide surface 34' of the housing 32' and causes an initial movement of the brake shoe 30 to be pressed against the cutter surface 8a. Therefore, the third inclined angle $\beta$' can be determined to be small as in the first embodiment.

The second braking device 16' in accordance with the second embodiment functions as follows. When the operator pulls the control lever 14 upwardly to start controlling the power of the engine 4, the brake shoe 30 is pulled by the brake wire member 19 interlocked with the manipulation of the control lever 14 whereby it is moved from the braking position shown in FIG. 4 to the released position. Since the second inclined angle α' of the inclined guide surface 34' is selected to be larger than the first inclined angle α of the inclined upper surface 24, the brake shoe 30 is be released from the pressing force exerted by the inclined guide surface 34' of the housing 32' when the brake shoe 30 is moved slightly toward the rotationally retarded side of the cutter 8. That is, by applying a small tension force to the brake wire member 19, the brake shoe 30 can be moved with ease from the braking position where the brake shoe 30 is pressed against the cutter surface 8a to the released position where the brake shoe 30 is spaced from the cutter surface 8a.

Figure 5:
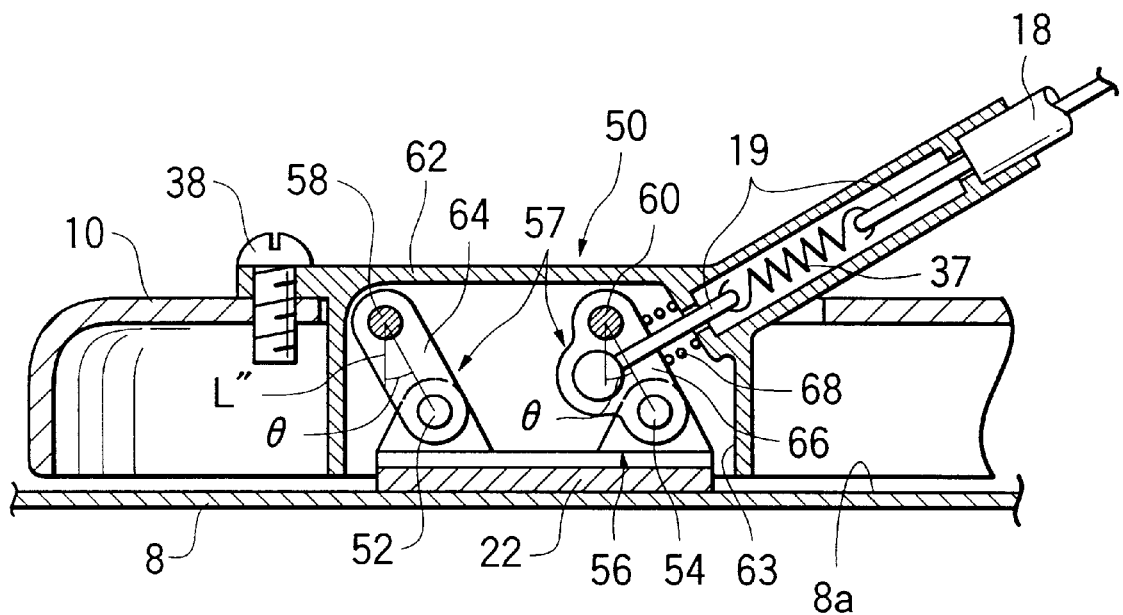
FIG. 5 shows a third embodiment of the braking device for stopping the free rotation of the cutter and is a cross-sectional view taken along a line V—V shown in FIG. 2 where a brake shoe is at a braking position.

FIG. 5 shows a third embodiment of the braking device for stopping the free rotation of the cutter 8 and is a cross-sectional view taken along a line V—V shown in FIG. 2 where a brake shoe is at the braking position. In FIG. 5, the same elements as those in the first embodiment are indicated by the same numerals and description therefor shall be omitted. As shown in FIG. 5, a third braking device 50 of the present invention has a brake shoe 56 provided with the brake lining 22 disposed opposite to the cutter surface 8a, a housing 62 which covers the brake shoe 56, and a parallel link mechanism 57 provided between the brake shoe 56 and the housing 62.

The parallel link mechanism 57 has a first link member 64 and a second link member 66 which are disposed parallel to and spaced from each other in a rotational direction of the cutter 8. The first link member 64 and the second link member 66 are connected to a first connecting point 52 and a second connecting point 54 pivotably joined with the brake shoe 56, and a third connecting point 58 and a fourth connecting point 60 which are pivotably joined with the housing 62. Both of the link members 64 and 66 form a predetermined angle θ inclined toward the rotationally retarded (trailing) side of the cutter 8 about the third and fourth connecting points 58 and 60 respectively with respect to a line L" vertical to the cutter surface 8a when the brake shoe 56 is at the braking position as shown in FIG. 5. The brake wire member 19 extending to the second link member 66 to the control lever 14 is connected to the second link member 66 which is disposed on the rotationally retarded side of the cutter 8. The brake wire member 19 extends to the control lever 14 and has the tension spring 37 disposed in the middle thereof and connected in series thereto. A compression coil spring 68 is provided around the brake wire member 19. The compression spring 68 pushes the second link member 66 toward the rotationally advanced (leading) side to cause the brake shoe 56 to be pressed against the cutter surface 8a. A spring force of the compression spring 68 is selected to be the minimum needed to cause an initial movement of the brake shoe 56 toward the braking position.

The third braking device 50 in accordance with the third embodiment functions as follows. When the operator pulls the control lever 14 upwardly to start the power control of the engine 4, the second link member 66 is pulled by the brake wire member 19 interlocked with the control lever 14 against the pressing force exerted by the compression spring 68. It causes the second link member 66 to oscillate whereby the brake shoe 56 is moved from the braking position shown in FIG. 5 to the released position. It is to be noted that the released position is a position where the brake shoe 56 is in abutment with an inner wall surface 63 of the housing 62 on the rotationally retarded side.

When the operator releases the control lever 14 to decelerate the engine 4, the second link member 66 is pushed by the compression spring 68 to cause it to swing to move the brake shoe 56 toward braking position. When the brake lining 22 makes contact with the cutter surface 8a, the brake shoe 56 is moved toward the rotationally advanced side by friction between the cutter surface 8a and the brake lining 22, whereby the brake shoe 56 is pressed against the cutter surface 8a by the first link member 64 and the second link member 66. It causes to stop the free rotation of the cutter 8 quickly. The pressing force is determined by a size of a predetermined angle θ formed by the first link member 64 and the second link member 66 with respect to the cutter surface 8a. That is, the larger the angle θ is, the stronger the brake shoe 56 being pressed against the cutter surface 8a by both of the link members 64, 66. A strong braking force is applied thereby to stop the free rotation of the cutter 8. On the other hand, the smaller the angle θ is, the weaker the braking force becomes. The value of the angle θ can be determined so that the free rotation of the cutter 8 can be stopped within a desired period of time and how strong the pressing force to be, as in the first and second embodiments.

When the control lever 14 is pulled upwardly once again to control the power of the engine 4, the brake shoe 56 is moved from the braking position shown in FIG. 5 to the released position by the tension force applied by the brake wire member 14. The function thereof is as stated hereabove.

Figure 6:
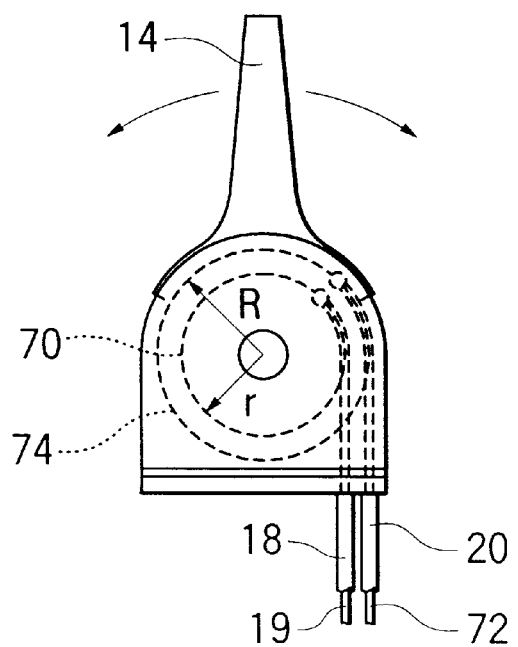
FIG. 6 is a schematic diagram of the control lever for controlling both of an engine and the braking device.

FIG. 6 is a schematic diagram of the control lever 14 for controlling both of the engine 4 and the braking device 16, 16' or 50. To release the braking action acting on the cutter 8 by the brake shoe 30 or 56 by the single control lever 14, it is sufficient to move the brake shoe 30 or 56 over a small distance, for example, approximately 0.5 mm. That is, the braking action can be released by moving the brake shoe 30 or 56 only a few millimeters by the brake wire member 19. On the other hand, to control the power of the engine 4 by the throttle wire member 72 connected with the control lever 14, the wire must be moved over a longer distance compared to that of the brake wire member 19. Therefore, the control lever 14 has a first take-up reel portion 70 having a first rotational radius r and a second take-up reel portion 74 which has a common center of rotation with the first take-up reel portion 70 and has a radius R which is larger than the radius r of the first take-up reel portion 70. The throttle wire member 72 is connected to the second take-up reel portion 74 at one end thereof. Since the first take-up portion 70 and the second take-up reel portion 74 have different radiuses r and R, the wire member 19 and the throttle wire member 72 move different distances from each other when the control lever 14 is pulled upwardly. The stroke absorption tension spring 37 can absorb the tension force exerted by the control lever 14 by stretching to allow an extra movement of the throttle wire member 72.

In accordance with the first through third embodiments, it can provide the braking device 16, 16', 50 which has a simple structure and is cost effective since it is constructed-by parts which can be easily made and assembled.

Further, in accordance with the first and second embodiments, since the braking device 16, 16' is provided with the rollers 28 which engage with the inclined guide surface 34, it facilitates to move the brake shoe 30 from the braking position to the released position along the inclined guide surface 34. Therefore, the operator can release the braking device 16, 16' with ease by applying a relatively weak force.

Furthermore, in accordance with the first and second embodiments, the angles β, β' of the tension springs 36, 36' are selected to be the minimum needed to cause the initial movement of the brake shoe 30 toward the braking position by the spring forces exerted by the tension springs 36, 36'. It enables to make the angles β, β' small, the operator can release the braking device 16, 16' with ease by applying a relatively weak force.

In accordance with the first embodiment, the free rotation of the cutter 8 can be stopped in a certain duration of time by adjusting the value of the first angle α of the inclined guide surface 34 and the inclined upper surface 24 of the brake shoe 30 to change the pressing force exerted by the inclined guide surface 34 and the inclined upper surface 24 on the brake shoe 30 against the cutter surface 8a.

Furthermore, in accordance with the second embodiment, since the second angle α' of the inclined guide surface 34' is selected to be larger than the first angle α of the inclined upper surface 24, the brake shoe 30 can be released from the pressing force exerted by the inclined guide surface 34' by moving the brake shoe 30 slightly toward the rotationally retarded side of the cutter 8. Therefore, the operator can release the braking action by the braking device 16' acting on the cutter 8 with ease by pulling the control lever 14 by a relatively weak force.

Furthermore, in accordance with the third embodiment, the spring force of the compression spring 68 is selected to be the minimum needed to cause the initial movement of the brake shoe 56 toward the braking position. Therefore, the operator can release the braking action by the braking device 50 acting on the cutter 8 with ease by a relatively weak force by pulling the control lever 14.

Furthermore, in accordance with the third embodiment, by adjusting the predetermined angle θ of the link members 64 and 66, the pressing force exerted on the cutter surface 8a can be changed whereby the time duration required to stop the cutter 8 can be changed.

Furthermore, in accordance with the first through third embodiments, since the control lever 14 is provided with the first take-up reel portion 70 having the first radius r of rotation and the second take-up reel portion 74 having the radius R of rotation larger than that of the first take-up reel portion 70. It enables to operate the braking device 16, 16', 50 to control the power control of the engine 4 by the same control lever 14 although they require different moving distance of the wires 19, 72. Further, the stroke absorption tension spring 37 connected with the brake wire member 19 disposed in the middle thereof and connected in series therewith can allow further wire movement caused by the further rotation of the control lever 14.

The present invention has thus been shown and described with reference to specific embodiments. However, it should be noted that the present invention is in no way limited to the details of the described arrangements but changes and modifications may be made without departing from the scope of the appended claims.

For example, the tension springs 36, 36' in the first and second embodiments do not need to be tension springs and compression springs which presses the brake shoe 30 directly against the cutter surface 8a.

Further, the compression spring 68 in accordance with the third embodiment does not need to be a compression spring and a tension spring which is oriented so as to press the brake shoe 56 against the cutter surface 8a can be utilized.

Furthermore, in the first through third embodiments, the braking devices 16, 16', 50 are mounted on the safety cover 10 on the side opposite to the cutting edge portion to be used of the trimming operation. However, they can be disposed at any location of the safety cover 10 as far as the elongated axis III—III thereof is oriented in a vertical direction with respect to the radius of the cutter 8.

In the embodiments hereabove, the braking devices are utilized for usage in the portable trimmer has been described. However, the braking device may be mounted on any types of cutting apparatuses in addition to the portable trimmer.

We claim:

1. A portable trimmer for cutting weeds, comprising:

a cutter;

driving means for rotationally driving said cutter;

a control lever for controlling power of said driving means;

a braking device for stopping rotation of said cutter; and an interlocking means operatively connected with said control lever and said breaking device;

said braking device having a brake shoe which is connected with said interlocking means and has an inclined upper surface inclined downwardly from a rotationally retarded side toward a rotationally advanced side of said cutter, a housing which encloses said brake shoe and has an inclined guide surface being opposed to said inclined upper surface of said brake shoe, and a pressing means for causing an initial movement of said brake shoe toward a cutter surface of said cutter, said pressing means being provided between said brake shoe and said housing; and said inclined guide surface guiding said brake shoe from a braking position to a released position where said brake shoe is spaced from said cutter surface toward said rotationally retarded side of said cutter by being pulled by said interlocking means against a pressing force applied by said pressing means.

2. A portable trimmer as recited in claim 1:

said housing of said braking device having stopper means for restricting a further movement of said brake shoe from said braking position toward said rotationally retarded side of said cutter, and further comprising an elastic member connected with said interlocking means in series.

\* \* \* \* \*